(12) United States Patent
Ahn

(10) Patent No.: US 12,261,332 B2
(45) Date of Patent: Mar. 25, 2025

(54) FUEL CELL SYSTEM FOR GENERATING ELECTRIC POWER AND METHOD OF CONTROLLING SAME

(71) Applicants: Hyundai Motor Company, Seoul (KR); Kia Corporation, Seoul (KR)

(72) Inventor: Jai Hyun Ahn, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 146 days.

(21) Appl. No.: 17/875,132

(22) Filed: Jul. 27, 2022

(65) Prior Publication Data
US 2023/0163330 A1 May 25, 2023

(30) Foreign Application Priority Data
Nov. 23, 2021 (KR) .................. 10-2021-0161946

(51) Int. Cl.
*H01M 8/04223* (2016.01)
*H01M 8/04228* (2016.01)

(52) U.S. Cl.
CPC ... *H01M 8/04231* (2013.01); *H01M 8/04228* (2016.02); *H01M 8/04253* (2013.01)

(58) Field of Classification Search
CPC ......... H01M 8/04089; H01M 8/04111; H01M 8/04225; H01M 8/04228; H01M 8/04231;
(Continued)

(56) References Cited

U.S. PATENT DOCUMENTS

2011/0065012 A1* 3/2011 Kwon ................ H01M 16/006
429/429
2015/0288041 A1* 10/2015 Forte ...................... H02J 1/108
429/429
(Continued)

FOREIGN PATENT DOCUMENTS

CN 102035002 B * 1/2013 ........ H01M 8/04164
KR 10-2009-0039253 4/2009
(Continued)

OTHER PUBLICATIONS

KR20140074556A, Yoon, et al. "Cold shutdown method of fuel cell vehicle", machine English translation retrieved from https://worldwide.espacenet.com/ Date: Aug. 21, 2024 (Year: 2014).*
(Continued)

*Primary Examiner* — Ekandra S. Miller-Cruz
*Assistant Examiner* — Jared Hansen
(74) *Attorney, Agent, or Firm* — Morgan, Lewis & Bockius LLP

(57) ABSTRACT

A fuel cell system and the method of controlling the fuel cell system improve next-time startability in the following manner. Hydrogen, air, generation water, and the like that remain inside a large-sized fuel cell system needs to be removed after finishing operation of the large-sized fuel cell system, such as a fuel cell system for generating electric power. To the present end, when an air compressor needs to be operated, one fuel cell module is selected as a power supply module, and an air compressor is operated by the power supply module. Thus, durability of a fuel cell stack is improved, and at the same time, a constant amount of generated electricity necessary to restart the large-sized fuel cell system is ensured.

9 Claims, 3 Drawing Sheets

(58) Field of Classification Search
CPC ........... H01M 8/04253; H01M 8/0432; H01M 8/04302; H01M 8/04303; H01M 8/04335; H01M 8/04365; H01M 8/04373; H01M 8/0494; H01M 8/04619; H01M 8/04626; H01M 8/04753; H01M 8/04947; H01M 8/04955; H01M 8/04992; H01M 16/006; H01M 2250/20; Y02E 60/50
See application file for complete search history.

(56) References Cited

U.S. PATENT DOCUMENTS

2020/0358114 A1* 11/2020 Park .................. H01M 8/04156
2020/0381935 A1* 12/2020 Shimada ............. H01M 10/486

FOREIGN PATENT DOCUMENTS

KR       10-1124990      3/2012
KR     20140074556 A * 6/2014

OTHER PUBLICATIONS

CN102035002B, Hou, et al. "Fuel cell module with water and thermal management capability", machine English translation retrieved from https://worldwide.espacenet.com/ Date: Dec. 16, 2024 (Year: 2013).*

* cited by examiner

FUEL CELL SYSTEM FOR GENERATING ELECTRIC POWER AND METHOD OF CONTROLLING SAME

CROSS REFERENCE TO RELATED APPLICATION

The present application claims priority to Korean Patent Application No. 10-2021-0161946, filed Nov. 23, 2021, the entire contents of which is incorporated herein for all purposes by this reference.

BACKGROUND OF THE PRESENT DISCLOSURE

Field of the Present Disclosure

The present disclosure relates to a fuel cell system and a method of controlling the fuel cell system. More precisely, the present disclosure relates to a fuel cell system for generating electric power and a method of controlling the fuel cell system. The fuel cell system and the method of controlling the fuel cell system improve next-time startability in the following manner. Hydrogen, air, generation water, and the like that remain inside a large-sized fuel cell system needs to be removed after finishing operation of the large-sized fuel cell system, such as a fuel cell system for generating electric power. To the present end, when an air compressor needs to be operated, one fuel cell module is selected as a power supply module, and an air compressor is operated by the power supply module. Thus, durability of a fuel cell stack is improved, and at the same time, a constant amount of generated electricity necessary to restart the large-sized fuel cell system is ensured.

Description of Related Art

A fuel cell is supplied with hydrogen as fuel and oxygen in air and generate electrical energy resulting from electrochemistry between the hydrogen and the oxygen. The present fuel cell may be used for supplying not only electric power for industrial use, home use, and use in a vehicle, but also for a small-sized electric/electronic product and a portable device.

For example, in a polymer electrolyte membrane fuel cell (PEMFC) including a high power density, a membrane-electrode assembly (MEA) which is a primary constituent component is positioned most inwardly. The membrane-electrode assembly includes a solid polymer electrolyte membrane, a cathode, and an anode. The solid polymer electrolyte membrane is configured for transporting a hydrogen ion. The cathode and the anode are electrode layers on opposite surfaces, respectively, of the solid polymer electrolyte membrane. A catalyst is applied to the electrode layers.

The fuel cell may supply electric power for industrial or home use to a building or the like. The fuel cell may be mounted in a vehicle to supply electric power for driving the vehicle. There is a need for a large-sized fuel cell system including a plurality of fuel cell stacks to manufacture a fuel cell for electricity generation. The fuel cell for electricity generation is mounted in a building or the like and generates a large amount of electric power.

A fuel cell system for generating electric power includes a plurality of fuel cell modules. Each of the fuel cell modules includes a fuel cell stack, an air compressor, an auxiliary battery, and the like. The fuel cell stack generates electrical energy therein through an electrochemical reaction. The air compressor starts the fuel cell stack. The auxiliary battery is configured to drive the air compressor.

When the fuel cell system is driven, hydrogen and oxygen react inside the fuel cell, and thus water is generated. At the present point, the water (generation water) reduces an activated surface area of a catalyst layer and causes loss in an electrode reaction. Furthermore, the water increases resistance to material transportation and causes a voltage drop. Consequently, there occurs in a problem in that the performance of the fuel cell is decreased.

Therefore, the fuel cell system needs to frequently discharge generated during operation of the fuel cell system to prevent a flooding phenomenon in which the generation water excessively accumulates.

Accordingly, during the operation of the fuel system, a situation where the air compressor is operated to discharge the remaining generation water from inside the fuel cell and where the operation of the fuel cell system is finished (shut down) occurs. At the instant time, the air compressor is operated by utilizing an output of the fuel cell stack.

Usually, in an environment where atmospheric temperature is low as in winter, when the fuel cell system is shut down, a phenomenon where the remaining generation water inside freezes occurs frequently. When the inside of fuel cell freezes, a flow path for hydrogen/oxygen or a diffusion layer is blocked, and thus hydrogen/oxygen is difficult to smoothly supply for operation of the fuel cell. Accordingly, it is difficult for a normal electrochemical reaction to occur. Thus, the performance of the fuel cell is decreased. Furthermore, when the fuel cell system is restarted after a predetermined time period elapses from the time the operation of the fuel cell system is finished (when improved next-time startability is needed), there occurs a problem in that the fuel cell system is not properly started.

Therefore, to more reliably remove the remaining generation water inside the fuel cell in winter, there is a need to additionally operate the air compressor (to perform additional draining) when the fuel cell module is shut down.

When the additional draining is performed, the fuel cell module is in a shut-down state. Therefore, the air compressor is driven by utilizing an output of the auxiliary battery. Accordingly, when the auxiliary battery is discharged or when the fuel cell stack is restarted, there occurs a problem in that an output as high as is necessary.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel cell system for generating electric power and a method of controlling the fuel cell system. The fuel cell system and the method of controlling the fuel cell system improve next-time startability in the following manner. Hydrogen, air, generated water, and the like that remain inside a large-sized fuel cell system needs to be removed after finishing operation of the large-sized fuel cell system, such as a fuel cell system for electricity generation. To the present end, when an air compressor needs to be operated, one fuel cell module is selected as a power supply module, and an air compressor is operated by the power supply module. Thus, durability of a fuel cell stack is improved, and at the same time, a constant amount of generated electricity necessary to restart the large-sized fuel cell system is ensured.

According to various aspects of the present disclosure, there is provided a fuel cell system for generating electric power, the system including: a plurality of fuel cell modules, each including a fuel cell stack, an air compressor, and an auxiliary battery; and a system controller configured to select at least one fuel cell module among the fuel cell modules as a power supply module and to operate the air compressor of the shut-down at least one fuel cell module through the power supply module when the at least one fuel cell module is shut down and when the air compressor needs to be operated.

In the fuel cell system, when the at least one fuel cell module is shut down and when the air compressor does not need to be operated, the system controller may charge the auxiliary battery through operation of the fuel cell module and may shut down the auxiliary battery.

In the fuel cell system, when the at least one fuel cell module is shut down and when the air compressor needs to be operated, the system controller may discharge the auxiliary battery and may shut down the auxiliary battery.

In the fuel cell system, when the at least one fuel cell module is shut down and when additional draining is necessary, the system controller may select the fuel cell module as the power supply module.

In the fuel cell system, among all the fuel cell modules, the system controller may select as the power supply module the fuel cell module including the highest value provided by an outside-air temperature detector.

In the fuel cell system, among all the fuel cell modules, the system controller is configured to select, as the power supply module, a fuel cell module of which the auxiliary battery has a highest state of charge.

In the fuel cell system, the system controller may cause the power supply module to charge the auxiliary battery while the additional draining is performed on the fuel cell module and may interrupt the charging of the auxiliary battery at a point in time when the performing of the additional draining is finished.

In the fuel cell system, the system controller may shut down the power supply module after finishing the performing of the additional draining on all the fuel cell modules on which the additional draining needs to be performed.

According to various aspects of the present disclosure, there is provided a method of controlling the fuel cell system, the method including: determining, by a system controller, whether or not an air compressor needs to be operated, when a fuel cell module is shut down; selecting, by the system controller, at least one fuel cell module as a power supply module; and operating, by the system controller, the air compressor of the shut-down at least one fuel cell module through the power supply module.

In the method, in the determining of whether or not the air compressor needs to be operated, time necessary to operate the air compressor of each of the fuel cell modules may be predicted, and the predicted time may be compared with a predetermined estimated time.

The method may further include discharging an auxiliary battery by consuming an output thereof when the air compressor needs to be operated, wherein the discharging of the auxiliary battery is performed before the selecting of the at least one fuel cell module as the power supply module.

In the method, in the selecting of the at least one fuel cell module as the power supply module, among all the fuel cell modules, the fuel cell module including the highest value provided by an outside-air temperature detector may be selected as the power supply module.

In the method, when two or more fuel cell modules have the highest value provided by the outside-air temperature detector, among all the fuel cell modules, the fuel cell module of which the auxiliary battery has the highest state of charge may be selected as the power supply module.

In the method, the operating of the air compressor of the shut-down at least one fuel cell module through the power supply module may include: performing additional draining after shutting down the fuel cell module of which the air compressor needs to be operated; and charging, by the power supply module, an auxiliary battery while the additional draining is performed on the fuel cell module.

The method may further include shutting down the power supply module after finishing the performing of the additional draining on all the fuel cell modules.

The fuel cell system for generating electric power according to an exemplary embodiment of the present disclosure is configured for improving next-time startability in the following manner. Hydrogen, air, generation water, and the like that remain inside a large-sized fuel cell system needs to be removed after finishing operation of the large-sized fuel cell system, such as a fuel cell system for generating electric power. To the present end, when an air compressor needs to be operated, one fuel cell module is selected as a power supply module, and an air compressor is operated by the power supply module. Thus, durability of a fuel cell stack is improved, and at the same time, a constant amount of generated electricity necessary to restart the large-sized fuel cell system is ensured.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
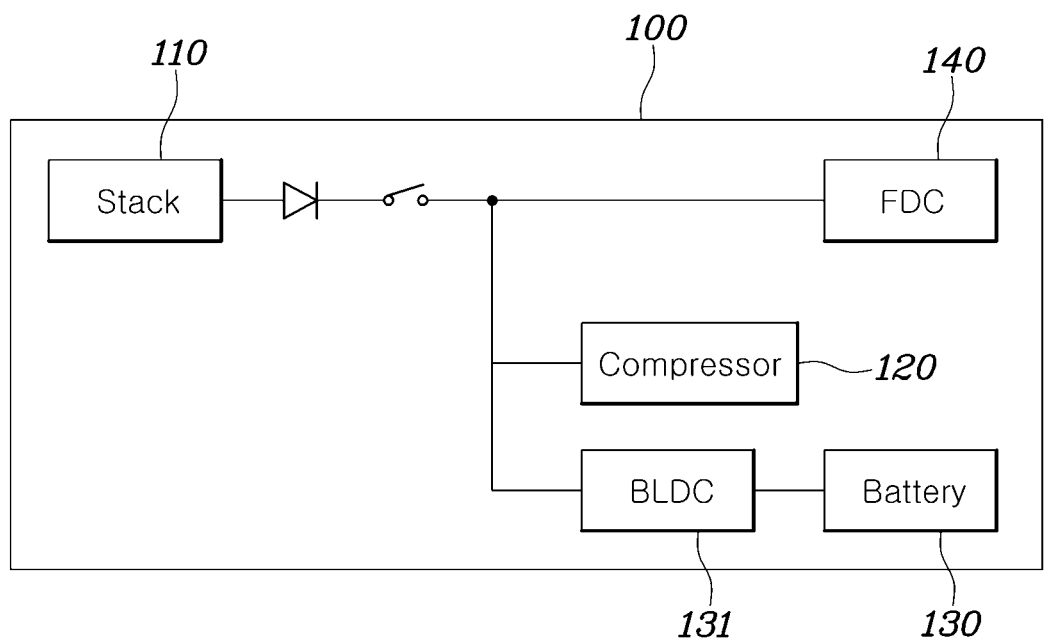
FIG. 1 is a view exemplarily illustrating one fuel cell module in a fuel cell system for generating electric power according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Unless otherwise described, the expression "a system or a method includes a constituent element", when used throughout the exemplary embodiment, means that a system or a method includes a constituent element and may further include any other constituent element without the possibility of excluding any other constituent element".

For disclosure, various embodiments of the present disclosure will be described in detail below in terms of configuration and operating principle with reference to the accompanying drawings.

Figure 2:
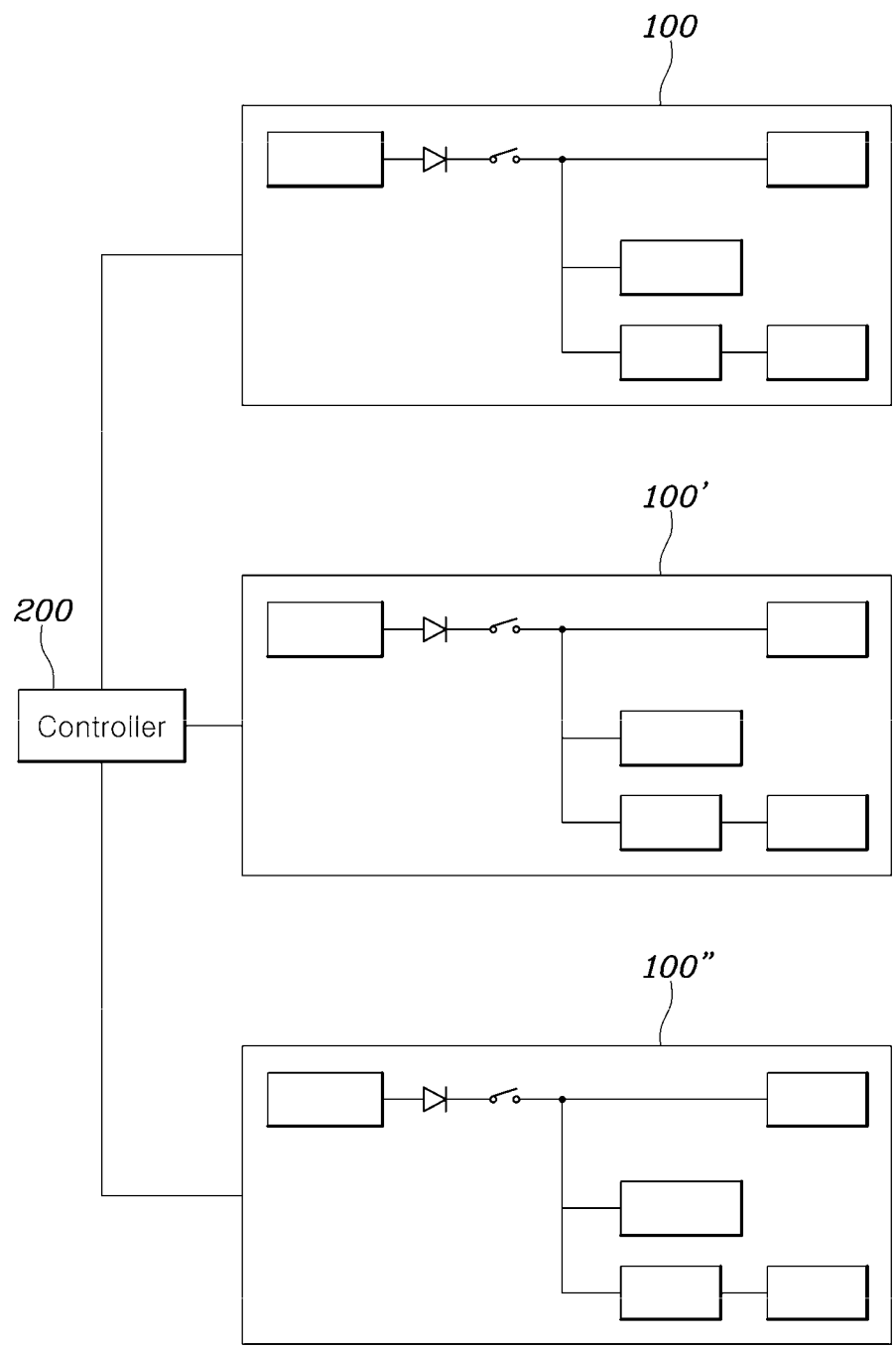
FIG. 2 is a view exemplarily illustrating the fuel cell system for generating electric power according to the various exemplary embodiments of the present disclosure.

FIG. 1 is a view exemplarily illustrating one fuel cell module 100 in a fuel cell system for generating electric power according to various exemplary embodiments of the present disclosure. FIG. 2 is a view exemplarily illustrating the fuel cell system for generating electric power according to the various exemplary embodiments of the present disclosure.

With reference to FIG. 1 and FIG. 2, the fuel cell system for generating electric power according to an exemplary embodiment of the present disclosure includes a plurality of fuel cell modules 100, 100', and 100" and a system controller 200. The plurality of fuel cell modules 100, 100', and 100" each include a fuel cell stack 110, an air compressor 120, and an auxiliary battery 130. When the fuel cell module 100, 100', or 100" is shut down and when the air compressor 120 needs to be operated, the system controller 200 selects at least one remaining fuel cell module as a power supply module and operates the air compressor 120 of the shut-down fuel cell module through the selected power supply module.

A controller according to various exemplary embodiments of the present disclosure may be realized through a nonvolatile memory and a processor. The nonvolatile memory is configured to store an algorithm generated for controlling operation of various components of a vehicle or data as to software commands for executing the algorithm. The processor is configured to perform operations described below using data stored in the nonvolatile memory. The memory and the processor here may be realized as individual chips. Alternatively, the memory and the processor may be realized as a single integrated chip. The processor may be a combination of one or more processors.

The fuel cell system for generating electric power according to an exemplary embodiment of the present disclosure includes the fuel cell modules 100, 100', and 100" and the system controller 200. The fuel cell modules 100, 100', and 100" each include the fuel cell stack 110 generating electrical energy therein through an electrochemical reaction, the air compressor 120 starting the fuel cell stack 110, the auxiliary battery 130 serving to drive the air compressor 120, and the like. The system controller 200 controls the plurality of fuel cell modules 100, 100', and 100".

The plurality of fuel cell modules 100, 100', and 100" have the same configuration. The terms of the second fuel cell module 100' and the third fuel cell module 100" are illustrated in FIG. 2 only to distinguish among the plurality of fuel cell modules 100, 100', and 100". The fuel cell system for generating electric power according to an exemplary embodiment of the present disclosure should not be understood as being simply configured to include only three fuel cell modules.

A method of operating a fuel cell system for generating electric power is first described to help understand the present disclosure. When starting the fuel cell system for generating electric power, the air compressor 120 is driven by utilizing an output of the auxiliary battery 130, and thus the fuel cell stack 110 is started. At the present point, usually, a 12V battery is currently used as the auxiliary battery 130. To start the fuel cell stack 110, a voltage of the auxiliary battery 130 needs to be boosted through a bidirectional DC-DC converter (BLDC) 131.

That is, the air compressor 120 is driven by utilizing the output of the auxiliary battery 130 which is boosted by the bidirectional DC-DC converter 131. Therefore, in FIG. 1, the auxiliary battery 130 and the bidirectional DC-DC converter 131 are both illustrated.

When the fuel cell stack 110 is normally started, operation of a fuel cell may generate the electrical energy and may supply electric power for industrial or home use. Moreover, the auxiliary battery 130 of which electric power is consumed for starting the fuel cell stack 110 is charged by utilizing an output of the fuel cell stack 110, and thus the output of the auxiliary battery 130 which is necessary for restarting the fuel cell stack 110 after being stopped is obtained.

During the operation of the fuel cell, water generated according to the electrochemical reaction (which is referred to as generation water) is accumulated inside the fuel cell stack 110. When a flooding phenomenon where the generation water is excessively accumulated occurs, performance of the fuel cell is decreased. Therefore, the air compressor 120 needs to be operated to remove the accumulated generation water. In the instant case, the air compressor 120 is operated by utilizing the output of the fuel cell stack 110.

Water in the fuel cell is configured as a medium for transporting a hydrogen ion. For the present reason, a suitable amount of water is required to operate the fuel cell. That is, the occurrence of a dry-out phenomenon where the generation water is too insufficient has an adverse effect on durability of the fuel cell stack 110, such as the occurrence of a degradation in the fuel cell stack 110.

Therefore, when the generation water is excessively removed by operating the air compressor 120, the fuel cell stack 110 may be degraded due to the dry-out phenomenon. To prevent the present degradation, the operation of the fuel cell may need to be temporarily stopped or finished (shut down).

To finish the operation of the fuel cell is finished, the following operations are sequentially performed. First, the air compressor 120 is operated (general shut-down) by utilizing the output of the fuel cell stack 110. Accordingly, turning-off of a main relay and stopping of the fuel cell stack 110 result from utilizing the output of the auxiliary battery 130. Accordingly, the air compressor 120 is additionally operated (additional draining) by utilizing the output of the auxiliary battery 130.

The additional draining here is an operation which is additionally performed under a low temperature condition, such as in winter, to prevent the remaining generation water from being frozen after finishing the operation of the fuel cell. Therefore, when the remaining generation water is not expected to be frozen, the additional draining may not be performed.

For description, in an environment where the additional draining needs to be performed, the general shut-down is performed under the low temperature condition earlier than the additional draining. Thus, for description, the additional draining is hereinafter defined as cold shut-down (CSD).

That is, the CSD may be understood as meaning the operating of the air compressor 120 by utilizing the output of the fuel cell stack 110 while the fuel cell stack 110 is operated in winter. The additional draining may be understood as meaning the operating of the air compressor 120 by utilizing the output of the auxiliary battery 130 after stopping operation of the fuel cell stack 110 in winter. Therefore, when the additional draining is performed, a state of charge (SOC) value of the auxiliary battery 130 is lowered.

Furthermore, for helping understand the present disclosure, the cases where the air compressor 120 needs to be operated may be hereinafter understood as including a case where the general shut-down is necessary and a case where the CSD is necessary, but not including the case where the additional draining is necessary.

That is, the case where the air compressor 120 needs to be operated and the case where the additional draining is necessary may be understood as being distinguished from each other.

Now, the turning-off of the main relay is described. When the operation of the fuel cell is finished, two contact points are brought into contact with each other due to an arc occurring between contact points of high-voltage relays, and thus a state where the turning-on and -off of the relay are not controlled can occur. Generally, the present state is expressed as a fusion of the main relay. When a fusion occurs in the main relay, although the operation is finished, a safety problem may also occur, such as an electric shock to a user due to a high voltage externally exposed when the operation is reperformed.

Therefore, when the operation of the fuel cell is finished, the main relay is required to return to an OFF state to prevent the fusion of the main relay. At the present point, for the turning-off of the main relay, the output of the auxiliary battery 130 which is boosted by the bidirectional DC-DC converter 131 is utilized. Therefore, like when the additional draining is performed, the SOC value of the auxiliary battery 130 is lowered.

The system controller 200 of the fuel cell system for generating electric power according to an exemplary embodiment of the present disclosure individually controls the plurality of fuel cell modules 100, 100', and 100". During the operation of the fuel cell system, when the air compressor 120 needs to be performed and when the fuel cell needs to be shut down, the system controller 200 performs the general shut-down or the CSD of the fuel cell module 100, 100', or 100" that needs to be shut down.

When the CSD is performed, correspondingly, the system controller 200 selects the fuel cell module 100, 100', or 100" as the power supply module, operates the fuel cell stack 110 of the power supply module, and operates the air compressor 120 of the shut-down fuel cell module 100, 100', or 100". For reference, at the present point, the operating of the air compressor 120 of the shut-down fuel cell module 100, 100', or 100" means that the additional draining is performed on the shut-down fuel cell module 100, 100', or 100".

The additional draining, as described above, means driving of the air compressor 120 using the auxiliary battery 130 instead of the fuel cell stack 110. Therefore, the air compressor 120 of the shut-down fuel cell module 100, 100', or 100" is operated using the output of the fuel cell stack 110 of the power supply module instead of the output of the auxiliary battery 130 of the shut-down fuel cell module 100, 100', or 100". Thus, the additional draining is performed on the shut-down fuel cell module 100, 100', or 100".

Accordingly, although one of the plurality of fuel cell modules 100, 100', and 100" is shut down, the additional draining may be stably performed. Although the additional draining is performed, the effect in which the auxiliary battery 130 retains an SOC high enough to restart the fuel cell system for generating electric power may be achieved.

For disclosure, the present disclosure will be described in more detail in terms of configuration and operating principle with reference to the accompanying drawings.

When one of the plurality of fuel cell modules 100, 100' and 100" is shut down and when the air compressor 120 does not need to be operated, the system controller 200 of the fuel cell system for generating electric power according to an exemplary embodiment of the present disclosure may charge the auxiliary battery 130 through operation of the remaining fuel cell module and may shut down the auxiliary battery 130.

This case may be understood as a case where a request to stop the fuel cell system is made of according to the user's need when neither the general shut-down nor the CSD is necessary and where the general shut-down is thus performed.

When neither the general shut-down nor the CSD is necessary, the generation water is kept appropriate inside the fuel cell stack 110. Thus, the fuel cell is stably operated. Therefore, there is no need to separately control the system controller 200.

However, when the request to stop the fuel cell system is made of according to the user's need, the SOC value of the auxiliary battery which is lowered as a result of the turning-off of the main relay needs to be restored to a previous state. The turning-off of the main relay is necessarily performed after the fuel cell system is stopped. To return to the previous SOC, the auxiliary battery 130 is sufficiently charged by operating the fuel cell stack 110 of each of the fuel cell modules 100, 100', and 100", and then the fuel cell system is stopped (the general shut-down).

For reference, at the present point, the bidirectional DC-DC converters 131 of all the fuel cell modules 100, 100', and 100" always operate in a buck mode. Thus, the auxiliary battery 130 is charged with electric power which is output from the fuel cell stack 110.

Thus, although the general shut-down is performed, the auxiliary battery 130 of each of the fuel cell modules 100, 100', and 100" can retain a sufficiently high SOC. Therefore, next-time startability may be improved when the fuel cell system for generating electric power is restarted.

When one of the plurality of cell modules 100, 100', and 100" is shut down and when the air compressor 120 needs to be operated, the system controller 200 of the fuel cell system for generating electric power according to an exemplary embodiment of the present disclosure may discharge the auxiliary battery 130 and then shut down the auxiliary battery 130.

This case is the case where the CSD is necessary and may be understood as a case where the request to stop the fuel cell system is made of according to the user's need. When the CSD is necessary, not only the main relay needs to be turned off, but also the additional draining needs to be performed. Therefore, the SOC value of the auxiliary battery 130 is lowered much more when the CSD is performed than when the general shut-down is performed. Thus, electric discharge frequently occurs.

Therefore, the system controller 200 of the fuel cell system for generating electric power according to an exemplary embodiment of the present disclosure performs control that initially provides the output of the auxiliary battery 130 as an output for the business purpose of generating electricity and that thus discharges the auxiliary battery 130. Accordingly, the system controller 200 performs control so that the discharged auxiliary battery 130 is charged at a later time using the power supply module. Thus, the user can use the output of the fuel cell stack 110 and the output of the auxiliary battery 130 at the same time during the operation of the fuel system.

A fuel cell system for generating electric power in the related art charges the auxiliary battery 130 through an output of the fuel cell during the operation thereof. Thus, the user cannot use a maximum output of the fuel cell. According to an exemplary embodiment of the present disclosure, this disadvantage may be alleviated.

In the fuel cell system for generating electric power generally, the bidirectional DC-DC converter 131 always operates in the buck mode. By contrast, during the operation of the fuel cell system for generating electric power according to an exemplary embodiment of the present disclosure, the bidirectional DC-DC converters 131 of all the fuel cell modules always operate in a boost mode. Thus, the electric power which is output from the fuel cell stack 110 is consumed, increasing an operating output.

When one of the plurality of fuel cell modules 100, 100', and 100" is shut down and when the additional draining is necessary, the system controller 200 of the fuel cell system for generating electric power according to an exemplary embodiment of the present disclosure may select the power supply module.

This case, like the case described above, is the case where the CSD is necessary and may be understood as the case where the request to stop the fuel cell system is made of according to the user's need. That is, when the CSD is necessary, the additional draining is required to be performed, and thus the SOC value of the auxiliary battery 130 is lowered. Thus, the likelihood of the auxiliary battery 130 being discharged is increased due to the lowered SOC thereof.

Therefore, the system controller 200 of the fuel cell system for generating electric power according to an exemplary embodiment of the present disclosure performs control that selects the fuel cell module as the power supply module, so that the auxiliary battery 130 of which the SOC is lowered or which is discharged is charged at a later time using the power supply module.

Accordingly, although the CSD and the additional draining are performed, the auxiliary battery 130 of each of the fuel cell modules 100, 100', and 100" can retain a sufficiently high SOC. Therefore, the next-time startability may be improved when the fuel cell system for generating electric power is restarted.

At the present point, one fuel cell module may be selected, as the power supply module, from among the plurality of fuel cell modules 100, 100', and 100" according to the following two references that will be in detail below.

The system controller 200 of the fuel cell system for generating electric power according to an exemplary embodiment of the present disclosure may select the fuel cell module having the highest value provided by an outside-air temperature detector, as the power supply module, from among the plurality of fuel cell modules 100, 100', and 100".

When the fuel cell operates, temperature of the fuel cell stack 110 rises due to heat resulting from an electrochemical reaction between hydrogen and oxygen inside the fuel cell stack 110. When the temperature of the fuel cell stack 110 rises to or above a predetermined high temperature, there occurs a problem in that durability of the fuel cell stack 110 is decreased due to a decrease in performance of the fuel cell or to a degradation of the fuel cell stack 110.

Therefore, usually, coolant or the like is caused to flow toward the outside of the fuel cell stack 110 during the operation of the fuel cell. Thus, the fuel cell stack 110 is frequently prevented from being heated to or above the predetermined high temperature.

However, the case where the CSD is necessary corresponds mostly to a case where temperature of outside air outside the fuel cell is low as in winter. Therefore, although the temperature of the fuel cell stack 110 rises due to the operation of the fuel cell, low temperature of the outside air makes the temperature of the fuel cell stack 110 difficult to rise to or above a predetermined temperature. Rather, as the performance of the fuel cell decreases, so does an amount of heat due to the operation of the fuel cell. Thus, the temperature of the fuel cell stack 110 gradually falls.

Therefore, from the present characteristic of the fuel cell, it may be understood that, when the CSD is necessary as in winter, among the plurality of fuel cell modules 100, 100', and 100", the fuel cell module having the highest value provided by the outside-air temperature detector produces electrical energy with the most stable performance.

That is, among the plurality of fuel cell modules 100, 100', and 100", the fuel cell module that produces the most stable output at a point in time when the shut-down of the fuel cell system is required is selected as the power supply module. Thus, the power supply module may be operated until immediately before system control by the system controller 200 is finished.

Accordingly, the power supply module charges the auxiliary batteries 130 of all the fuel cell modules 100, 100', and 100" and then the system control is finished. Therefore, the next-time startability may be improved when the fuel cell system for generating electric power is restarted.

Among all the fuel cell modules 100, 100', and 100", the system controller 200 of the fuel cell system for generating electric power according to an exemplary embodiment of the present disclosure may select as the power supply module the fuel cell module of which the auxiliary battery 130 has the highest state of charge.

As described above, the power supply module is configured to charge the auxiliary batteries 130 of all the fuel cell modules 100, 100', and 100", including the fuel cell module which is selected as the power supply module. That is, the power supply module charges the auxiliary batteries 130 of the fuel cell modules other than the fuel cell module which is selected as the power supply module, and at the same time, charges the auxiliary battery 130 of the fuel cell module itself selected as the power supply module.

The higher the SOC value of the auxiliary battery 130 of the power supply module itself, the more the time taken to shut down the power supply module is shortened. At the present point, the power supply module is shut down after the auxiliary batteries 130 of the fuel cell modules other than the fuel cell module selected as the power supply module are completely charged. Therefore, the fuel cell module whose auxiliary battery 130 has the highest SOC needs to be selected as the power supply module.

For reference, a selection reference for selecting the fuel cell module as the power supply module in the present manner according to the SOC value of the auxiliary battery 130 applies to a case where, among all the fuel cell modules 100, 100', and 100", two or more fuel cell modules have the highest value provided by the outside-air temperature detector.

The system controller 200 of the fuel cell system for generating electric power according to an exemplary embodiment of the present disclosure may cause the power supply module to charge the auxiliary battery 130 while the additional draining is performed on the fuel cell module, and may stop the charging of the auxiliary battery 130 at a point in time when the performing of the additional draining is finished.

As described above, the power supply module is configured to charge the auxiliary batteries 130 of all the fuel cell modules including the fuel cell module selected as the power cell module. At the present point, the auxiliary battery 130 is charged by the power supply module only while the additional draining is performed on the fuel cell module on which the additional draining needs to be performed. The charging of the auxiliary battery 130 is finished at a point in time when the performing of the additional draining is finished.

That is, although the auxiliary battery 130 is not charged to 100% of the capacity at a point in time when the performing of the additional draining is finished, the charging of the auxiliary battery 130 by the power supply module is finished. The reason for this is because each of the auxiliary batteries 130 of all the fuel cell modules 100, 100', and 100" only needs to retain the SOC high enough to perform restarting. The reason that the auxiliary battery 130 is charged by the power supply module is to ensure the next-time startability of the fuel cell system for generating electric power.

Furthermore, when the CSD of the fuel cell module is again necessary during the operation of the fuel system after the restarting, the system controller 200 discharges the auxiliary batteries 130 of all the fuel cell modules 100, 100', and 100" and then recharges the auxiliary batteries 130 thereof after one fuel cell module is as the power supply module. Therefore, it is inefficient to keep all the auxiliary batteries 130 charged to 100% of the capacity.

Therefore, the system controller 200 of the fuel cell system for generating electric power according to an exemplary embodiment of the present disclosure causes the power supply module to charge the auxiliary battery 130 only while the additional draining is performed on the fuel cell module and stops the charging of the auxiliary battery 130 at a point in time when the performing of the additional draining is finished. Thus, the effect of more efficiently ensuring the next-time startability of the fuel cell system for generating electric power may be achieved.

The system controller 200 of the fuel cell system for generating electric power according to an exemplary embodiment of the present disclosure may shut down the power supply module after finishing the performing of the additional draining on all the fuel cell modules 100, 100', and 100" on which the additional draining needs to be performed.

The power supply module needs to charge the auxiliary batteries 130 of all the fuel cell modules 100, 100', and 100", but until the performing of the additional draining on the fuel cell module on which the additional draining needs to be performed is finished. Therefore, the charging of the auxiliary battery 130 cannot be interrupted until before the performing of the additional draining on all the fuel cell modules 100, 100', and 100" on which the additional draining needs to be performed is finished.

That is, the power supply module itself is set to be shut down after the fuel cell modules other than the fuel cell module selected as the power supply module are shut down.

Therefore, the system controller 200 of the fuel cell system for generating electric power according to an exemplary embodiment of the present disclosure shuts down the power supply module after finishing the performing of the additional draining on all the fuel cell modules 100, 100', and 100" on which the additional draining needs to be performed. Thus, the effect of ensuring the next-time startability of the fuel cell system for generating electric power and at the same time stably stopping the fuel cell system may be achieved.

Figure 3:
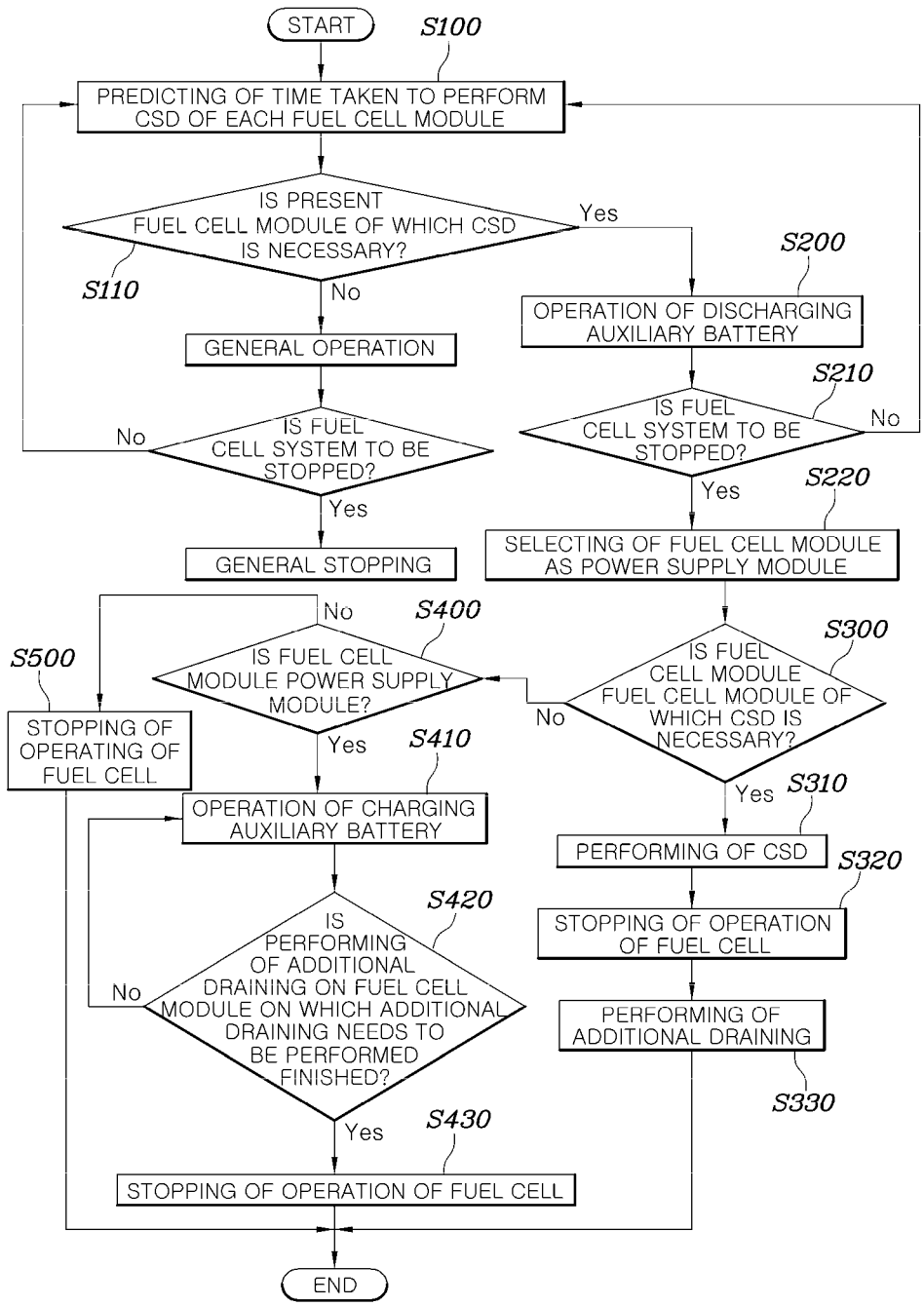
FIG. 3 is a flowchart for a method of controlling a fuel cell system for generating electric power according to various exemplary embodiments of the present disclosure.

FIG. 3 is a flowchart illustrating a method of controlling a fuel cell system for generating electric power according to various exemplary embodiments of the present disclosure.

With reference to FIG. 3, the method of controlling a fuel cell system for generating electric power according to an exemplary embodiment of the present disclosure includes Steps S100 and S110 of determining, by a system controller 200, whether or not an air compressor 120 needs to be performed when a fuel cell module 100, 100', or 100" is shut down; Step S220 of selecting at least one remaining fuel cell module as a power supply module; and a step of operating, by the power supply module, the air compressor 120 of the shut-down fuel cell module.

In Steps S100 and S110 of determining whether or the air compressor 120 needs to be operated, a state of each of the fuel cell modules 100, 100', and 100" is checked during operation of a fuel cell system. When general shut-down and CSD of none of the plurality of fuel cell modules 100, 100', and 100" are necessary, it is determined whether or not the general show-down is performed because a request to stop the fuel cell system is made of according to a user's need. Alternatively, when the CSD of any one of the plurality of fuel cell modules 100, 100', and 100" is necessary, it is determined whether or not the CSD is performed because the request to stop the fuel cell system is made of according to a user's need.

In Steps S100 and S110 of determining whether or not the air compressor 120 needs to be operated, the time necessary to operate the air compressor 120 of each of the fuel cell modules 100, 100', and 100" may be predicted (Step S100), and the predicted time may be compared with predetermined estimated time (S110).

That is, during the operation of the fuel system, the system controller 200 checks an amount of generation water accumulated inside a fuel cell stack 110 of each of all the fuel cell modules 100, 100', and 100", predicts the time taken for each of all the fuel cell modules 100, 100', and 100" to operate the air compressor 120 to remove the generation water which is accumulated, and determines by comparing the predicted time with the predetermined estimated time corresponding to the predicted time whether or not the fuel cell module of which the CSD is necessary is present.

At the present point, the time taken for each of all the fuel cell modules 100, 100', and 100" to operate the air compressor 120 may be predicted from a value of an outside-air temperature detector for each of all the fuel cell modules 100, 100', and 100", and the predetermined estimated time corresponding to the value thereof may be stored, as a data value (for example, 25 seconds when the temperature of the outside air is lower than −20° C.) obtained through many experiments, in a memory of the system controller 200.

When the fuel cell module of which the CSD is necessary is not present as a result of comparing the predicted time with the estimated time, the system controller 200 performs a general operation without performing separate control and continuously determines until the request to stop the fuel cell system is made of according to the user's need whether or not the air compressor 120 of each of all the fuel modules 100, 100', and 100" needs to be operated. When the request to stop the fuel cell system is made of according to the user's need, the system controller 200 stops the fuel cell system.

Regarding a case where the fuel cell module of which the CSD is necessary is present, steps of the method of controlling a fuel cell system for generating electric power according to the various exemplary embodiments of the present disclosure are described in detail below for disclosure.

The fuel cell system for generating electric power according to an exemplary embodiment of the present disclosure may further include Step S200 of discharging an auxiliary battery 130 by consuming an output thereof when the air compressor 120 needs to be operated. Step S200 is performed before Step S220 of selecting at least one fuel cell module as the power supply module.

The reason for this, as described above, is because when the CSD is necessary, not only does the main relay need to be turned off, but also the additional draining needs to be performed. Therefore, the SOC value of the auxiliary battery 130 is lowered much more than when the general shut-down is performed. Furthermore, the likelihood of the auxiliary battery 130 being discharged is increased in some cases.

Therefore, in the method of controlling a fuel cell system for generating electric power according to an exemplary embodiment of the present disclosure, an output of the auxiliary battery 130 is initially provided as an output for the business purpose of generating electricity, and thus the auxiliary battery 130 is discharged. Accordingly, one fuel cell module is selected as the power supply module, and the discharged auxiliary battery 130 is charged by the power supply module.

Accordingly, during operation of a fuel cell, a maximum output of the fuel cell may be used. Accordingly, the bidirectional DC-DC converter 131 always operates in the buck mode during operation of the fuel cell system for generating electric power in the related art. Thus, the disadvantage of the user being unable to use the maximum output of the fuel cell may be overcome.

In Step S220 of selecting at least one fuel cell module as the power supply module, among all the fuel cell modules 100, 100', and 100", the fuel cell module including the highest value provided by the outside-air temperature detector may be selected as the power supply module.

The reason for this, as described, is because it may be understood from the characteristic of the fuel cell that when the CSD is necessary as in winter, the fuel cell module having the highest value provided by the outside-air temperature detector produces the electrical energy with the most stable performance. Therefore, among all the fuel cell modules 100, 100', and 100", the fuel cell module that produces the most stable output at a point in time when the shut-down of the fuel cell system is required is selected as the power supply module. Thus, the power supply module may be operated until immediately before system control by the system controller 200 is finished.

When two or more fuel cell modules has the highest value provided by the outside-air temperature detector, the fuel cell module of which the auxiliary battery 130 has the highest state of charge may be selected as the power supply module.

The reason for this, as described above, is because the higher the SOC value of the auxiliary battery 130 of the power supply module itself, the more the time taken to shut down the power supply module is shortened. At the present point, the power supply module is shut down after the auxiliary batteries 130 of the fuel cell modules other than the fuel cell module selected as the power supply module are completely charged.

For reference, a selection reference for selecting the fuel cell module as the power supply module in the present manner according to the SOC value of the auxiliary battery 130 applies to a case where, among all the fuel cell modules 100, 100', and 100", two or more fuel cell modules have the highest value provided by the outside-air temperature detector.

The step of operating, by the power supply module, the air compressor 120 of the shut-down fuel cell module may include: Steps S320, and S330 of performing the additional draining after shutting down the engine cell module of which the air compressor 120 needs to be operated; and Step S410 of charging, by the power supply module, the auxiliary battery 130 while performing the additional draining on the fuel cell module.

The reason for this, as described above, is because the power supply module charges each of the auxiliary batteries 130 of all the fuel cell modules 100, 100', and 100" only to retain the SOC predetermined enough to perform restarting. Furthermore, it is inefficient to keep all the auxiliary batteries 130 charged to 100% of the capacity because the auxiliary batteries 130 are discharged when the CSD of the fuel cell module is again performed during the operation of the fuel system after the restarting.

It is determined whether or not the additional draining needs to be performed on each of all the fuel cell modules 100, 100', and 100". When the fuel cell module on which the additional draining needs to be performed is present, the CSD of the present fuel cell module is performed (S320). Accordingly, operation of the fuel cell stack 110 is stopped (S320), and the additional draining is performed (S330). When the fuel cell module on which the additional draining needs to be performed is not present, it is additionally determined whether or not this fuel cell module is the power supply module (S400). When the present fuel cell module corresponds to the power supply module, the auxiliary battery 130 is charged by the power supply module (S410). When the present fuel cell module does not correspond to the power supply module, the fuel cell stack 110 of the present fuel cell module is immediately stopped (S500).

The method of controlling a fuel cell system for generating electric power according to an exemplary embodiment of the present disclosure may further include Steps S420 and S430 of shutting down the power supply module after finishing the performing of the additional draining on all the fuel cell modules 100, 100', and 100".

The reason for this, as described above, is because the power supply module needs to charge all the fuel cell modules 100, 100', and 100" until the performing of the additional draining on the fuel cell module on which the additional draining needs to be performed is finished. Therefore, the charging of the auxiliary battery 130 cannot be interrupted until before the performing of the additional draining on all the fuel cell modules 100, 100', and 100" on which the additional draining needs to be performed is finished.

It is determined while the auxiliary battery 130 is charged by the power supply module whether or not the performing of the additional draining on the fuel cell module on which the additional draining needs to be performed is finished (S420), and the power supply module is shut down after the performing of the additional draining on all the fuel cell modules 100, 100', and 100" on which the additional draining needs to be finished (S430).

That is, it is after all the fuel cell modules other than the fuel module selected as the power supply module are shut down that the power supply module itself is shut down. Accordingly, not only may the next-time startability of the fuel cell system for generating electric power be ensured, but the fuel cell system may also be stably stopped.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel cell system for generating electric power, the system comprising:
   a plurality of fuel cell modules, each including a fuel cell stack, an air compressor, and an auxiliary battery; and
   a system controller configured to select at least one fuel cell module among the fuel cell modules as a power supply module and, when the at least one fuel cell module is shut down and when the air compressor needs to be operated, configured to operate the air compressor of the at least one fuel cell module when the at least one fuel cell module is shut down, through the power supply module,
   wherein when the at least one fuel cell module is shut down and when additional draining is necessary, the system controller is configured to select the at least one fuel cell module as the power supply module, and
   wherein among all the fuel cell modules, the system controller is configured to select, as the power supply module, a fuel cell module having a highest value provided by an outside-air temperature detector.

2. The fuel cell system of claim 1, wherein when the at least one fuel cell module is shut down and when the air compressor does not need to be operated, the system controller is configured to charge the auxiliary battery through operation of remaining fuel cell module among the fuel cell modules and shuts down the auxiliary battery.

3. The fuel cell system of claim 1, wherein when the at least one fuel cell module is shut down and when the air compressor needs to be operated, the system controller is configured to discharge the auxiliary battery and shuts down the auxiliary battery.

4. The fuel cell system of claim 1, wherein when two or more fuel cell modules have the highest value provided by the outside-air temperature detector, among all the fuel cell modules, the system controller is configured to select the at least one fuel cell module of which the auxiliary battery has a highest state of charge as the power supply module.

5. The fuel cell system of claim 1, wherein the system controller is configured to cause the power supply module to charge the auxiliary battery while the additional draining is performed on the at least one fuel cell module and configured to interrupt the charging of the auxiliary battery at a point in time when the performing of the additional draining is finished.

6. The fuel cell system of claim 5, wherein the system controller is configured to shut down the power supply module after finishing the performing of the additional draining on all the fuel cell modules on which the additional draining needs to be performed.

7. The fuel cell system of claim 1, wherein in the determining of whether the air compressor needs to be operated, the system controller is configured to predict time necessary to operate the air compressor of each of the fuel cell modules, and configured to compare the predicted time with a predetermined estimated time.

8. The method of claim 1, wherein the system controller is configured to discharge the auxiliary battery by consuming an output thereof when the air compressor needs to be operated,
   wherein the discharging of the auxiliary battery is performed by the system controller before the selecting of the at least one fuel cell module as the power supply module.

9. A fuel cell system for generating electric power, the system comprising:
   a plurality of fuel cell modules, each including a fuel cell stack, an air compressor, and an auxiliary battery; and
   a system controller configured to select at least one fuel cell module among the fuel cell modules as a power supply module and, when the at least one fuel cell module is shut down and when the air compressor needs to be operated, configured to operate the air compressor of the at least one fuel cell module when the at least one fuel cell module is shut down, through the power supply module,
   wherein when the at least one fuel cell module is shut down and when additional draining is necessary, the system controller is configured to select the at least one fuel cell module as the power supply module, and
   wherein among all the fuel cell modules, the system controller is configured to select, as the power supply module, a fuel cell module of which the auxiliary battery has a highest state of charge.

* * * * *